(12) United States Patent
Qian et al.

(10) Patent No.: US 6,473,318 B1
(45) Date of Patent: Oct. 29, 2002

(54) LEAKAGE ENERGY RECOVERING SYSTEM AND METHOD FOR FLYBACK CONVERTER

(75) Inventors: Jinrong Qian, Croton-on-Hudson, NY (US); Da Feng Weng, Yorktown Heights, NY (US)

(73) Assignee: Koninklijke Philips Electronics N.V. (NL)

( * ) Notice: Subject to any disclaimer, the term of this patent is extended or adjusted under 35 U.S.C. 154(b) by 86 days.

(21) Appl. No.: 09/716,914

(22) Filed: Nov. 20, 2000

(51) Int. Cl.[7] .............................................. H02M 3/335
(52) U.S. Cl. ................ 363/21.16; 363/21.12; 363/56.12
(58) Field of Search ............................ 363/20, 97, 131, 363/16, 21.12, 21.16, 56.12, 55, 56.01

(56) References Cited

U.S. PATENT DOCUMENTS

| | | |
|---|---|---|
| 3,621,363 A | 11/1971 | Glanman |
| 4,274,133 A | 6/1981 | Cuk et al. |
| 4,355,352 A | 10/1982 | Bloom et al. |
| 4,441,146 A | 4/1984 | Vinciarelli |
| 4,561,046 A | 12/1985 | Kuster |
| 4,675,796 A | 6/1987 | Gautherin et al. |
| 4,688,160 A | 8/1987 | Fraidlin |
| 4,736,285 A | 4/1988 | Cohen |
| 4,760,512 A | 7/1988 | Loftus |
| 4,783,727 A | 11/1988 | Neumann |
| 4,805,079 A | 2/1989 | Van Buul |
| 4,899,270 A | 2/1990 | Bond |
| 5,019,957 A | 5/1991 | Wilkinson |
| 5,055,991 A | 10/1991 | Carroll et al. |
| 5,075,838 A | 12/1991 | Schnetzka et al. |
| 5,260,607 A | 11/1993 | Kinbara |
| 5,379,206 A | 1/1995 | Davidson |
| 5,430,633 A | 7/1995 | Smith |
| 5,521,807 A | 5/1996 | Chen et al. |
| 5,615,094 A | 3/1997 | Cosentino et al. |
| 5,694,304 A | 12/1997 | Telefus et al. |
| 5,731,966 A | 3/1998 | Liu |
| 5,745,353 A | 4/1998 | Sato et al. |
| 5,757,626 A * | 5/1998 | Jovanovic et al. .......... 363/132 |
| RE36,098 E | 2/1999 | Vinciarelli |
| 5,883,793 A | 3/1999 | Farrington |
| 5,883,795 A | 3/1999 | Farrington |
| 5,896,284 A | 4/1999 | Murasato et al. |
| 5,982,638 A | 11/1999 | Tang et al. |
| 5,999,419 A | 12/1999 | Marrero |
| 6,005,782 A | 12/1999 | Jain et al. |
| 6,061,253 A * | 5/2000 | Igarashi et al. ................ 363/19 |
| 6,061,254 A | 5/2000 | Takegami |
| 6,115,271 A | 9/2000 | Mo |
| 6,130,824 A | 10/2000 | Hosotani |
| 6,314,002 B1 * | 11/2001 | Qian et al. ............... 363/21.04 |
| 6,421,255 B1 * | 7/2002 | Frebel et al. .................. 363/20 |

* cited by examiner

Primary Examiner—Jeffrey Sterrett
Assistant Examiner—Gary L. Laxton
(74) Attorney, Agent, or Firm—Dicran Halajian (57) ABSTRACT

An switching converter, having a transformer having primary, secondary and auxiliary windings, an actively controlled switch, a capacitor and a first passive switch in series across the primary, the auxiliary winding of the transformer and a second passive switch being connected in series to the node between the capacitor and first passive switch, with the active switch being connected to a side of the primary winding opposite the first passive switch. The method energizes a transformer core with the primary winding and discharges a capacitor during an ON state; and clamps a voltage across the active switch with the capacitor, and transfers magnetizing energy to the secondary winding during an OFF state, to efficiently transfer energy corresponding to a switching transient to the load while limiting maximum active switch voltage.

20 Claims, 5 Drawing Sheets

LEAKAGE ENERGY RECOVERING SYSTEM AND METHOD FOR FLYBACK CONVERTER

FIELD OF THE INVENTION

The present invention relates to the field of switching power transfer devices, and more particularly to an improved energy recovery method for a flyback converter.

BACKGROUND OF THE INVENTION

The leakage inductance of the transformer in a conventional DC/DC flyback converter causes a voltage spike across the power switch when the power switch turns off Usually a circuit, such as a R-C-D (resistor, capacitor, diode) snubber circuit or an active clamp circuit, is used to absorb this voltage spike. The leakage energy of the transformer is typically dissipated in the R-C-D snubber circuit.

A number of known designs seek to recover this energy. These methods typically require an additional active switch to recover the leakage energy of the transformer.

Figure 1:
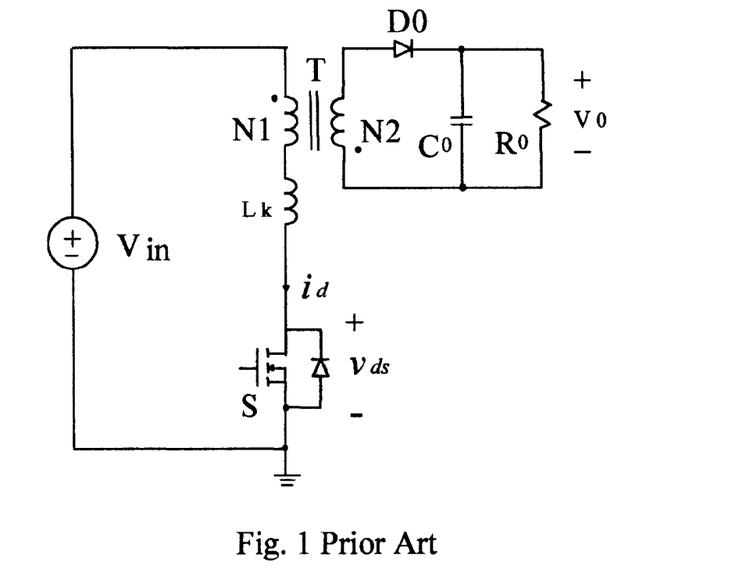
FIG. 1 shows a conventional DC/DC flyback converter according to the prior art.
Figure 2:
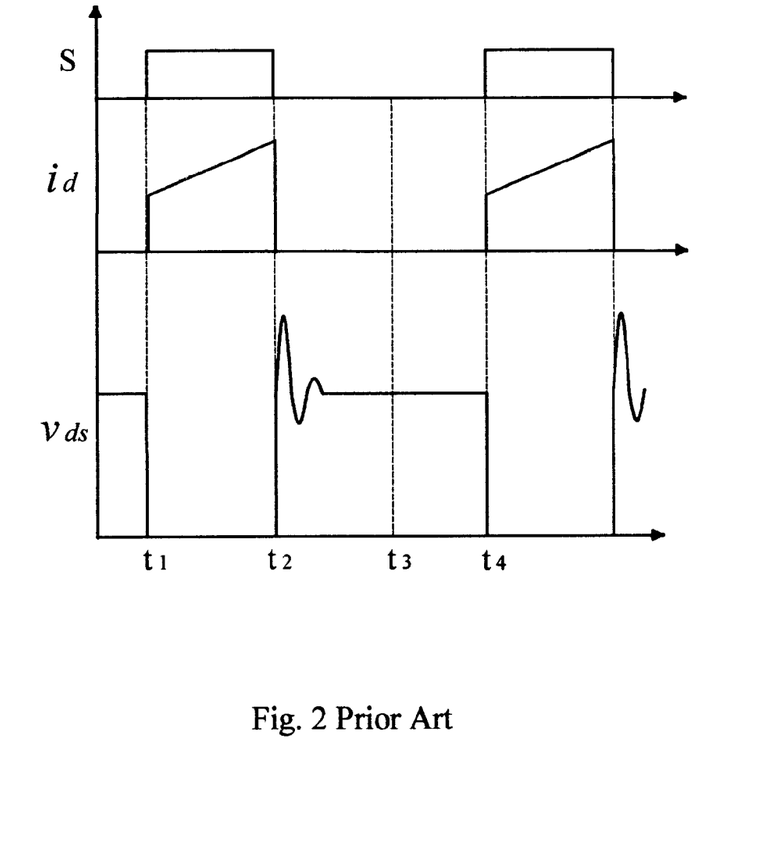
FIG. 2 shows switching waveforms of the circuit according to FIG. 1.

A well-known conventional DC/DC flyback converter is shown in FIG. 1, where $L_k$ is the leakage inductance of the transformer T. The typical switching waveforms of FIG. 1 are shown in FIG. 2. When switch S is turned off at $t_2$, the leakage current charges the parasitic output capacitance of switch S (output capacitance of S is not shown in FIG. 1), which causes a high voltage spike across switch S. After the leakage energy is completely released, the voltage across switch S reaches its steady-state value. As a result, a high voltage rating voltage switch S would be required.

Figure 3:
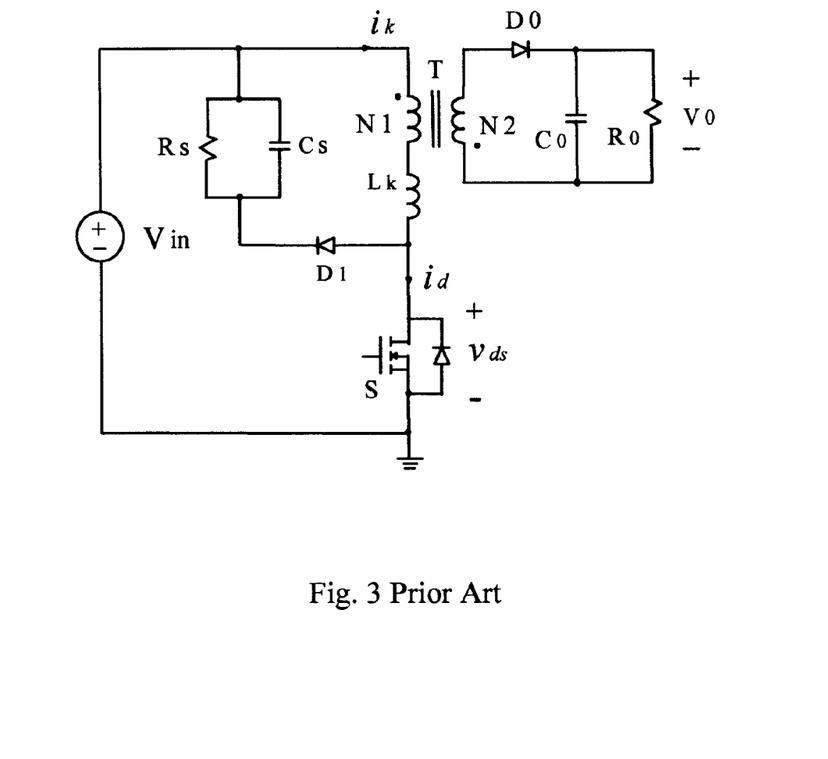
FIG. 3 shows a DC/DC flyback converter with an R-C-D snubber according to the prior art.

To eliminate this voltage spike, a number of circuit topologies have been reported in the literature. Among them, the R-C-D snubber is one of the most popular ways to minimize the voltage spike as shown in FIG. 3. The snubber circuit consists of diode D1, capacitor $C_s$ and resistor $R_s$. When switch S is turned off, the leakage current flows through diode D1 and charges capacitance $C_s$. If capacitance $C_s$ is relatively large enough, the voltage across $C_s$ roughly does not change, so as to clamp the voltage. In this case, the leakage energy of the transformer is first charged to $C_s$ and is then dissipated by the resistor $R_s$. As a result, the voltage clamp is achieved at the expense of low conversion efficiency, i.e., loss of the energy inherent in the spike to heat.

Figure 4:
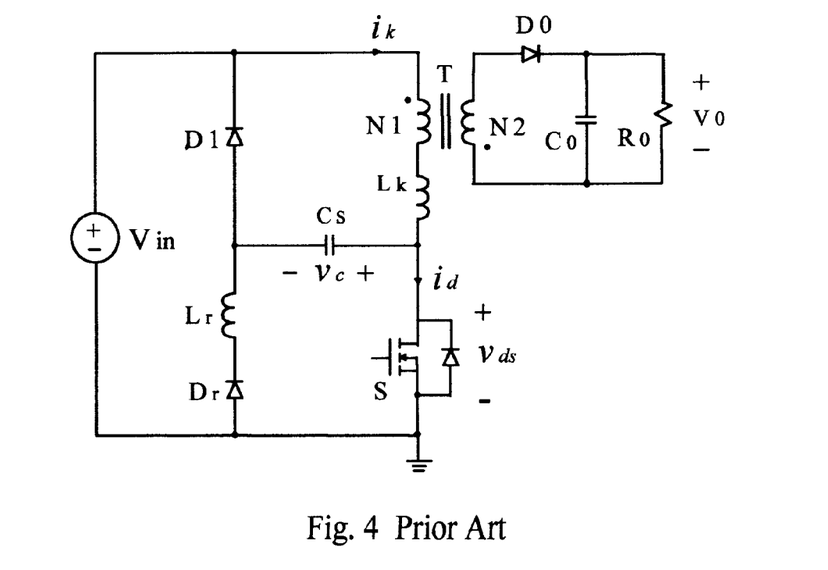
FIG. 4 shows a DC/DC flyback converter with an inductor and C-D snubber with a separate inductor according to the prior art.

Another prior art circuit is shown in FIG. 4. See, Moshe Domb, "Nondissipative turn-off snubber alleviates switching power dissipation second-breakdown stress and Vce overshoot: analysis, design procedure and experimental verification," IEEE Power Electronics Specialists Conference (1982). In this circuit, when switch S is turned off, the leakage energy of the transformer T is transferred to the clamping capacitor $C_s$ through D1. The voltage stress across switch S is the sum of the input voltage $V_{in}$ and the clamping voltage $V_c$ across $C_s$, which is expressed as follows $$V_{ds,max} = V_{in} + V_c.$$

When switch S is turned on, the clamping capacitor $C_s$ and inductor $L_r$ form a resonant tank. The energy stored in capacitor $C_s$ is transferred to the inductor $L_r$ and the voltage polarity across capacitor $C_s$ reverses due to the resonance. When the capacitor voltage $v_c$ reverses and reaches the input voltage $V_{in}$, diode D1 conducts. The energy stored in $L_r$ is delivered to the input source. Therefore, the leakage energy of the transformer is finally feedback to the input source. In this scheme, an additional separate inductor $L_r$ is required, which increases the cost. See, U.S. Pat. Nos. 4,783,727, "DC/DC Converter"; 6,115,271, "Switching Power Converters With Improved Lossless Snubber Networks", 5,260,607, "Snubber Circuit For Power Converter", each of which is incorporated herein by reference.

Figure 5:
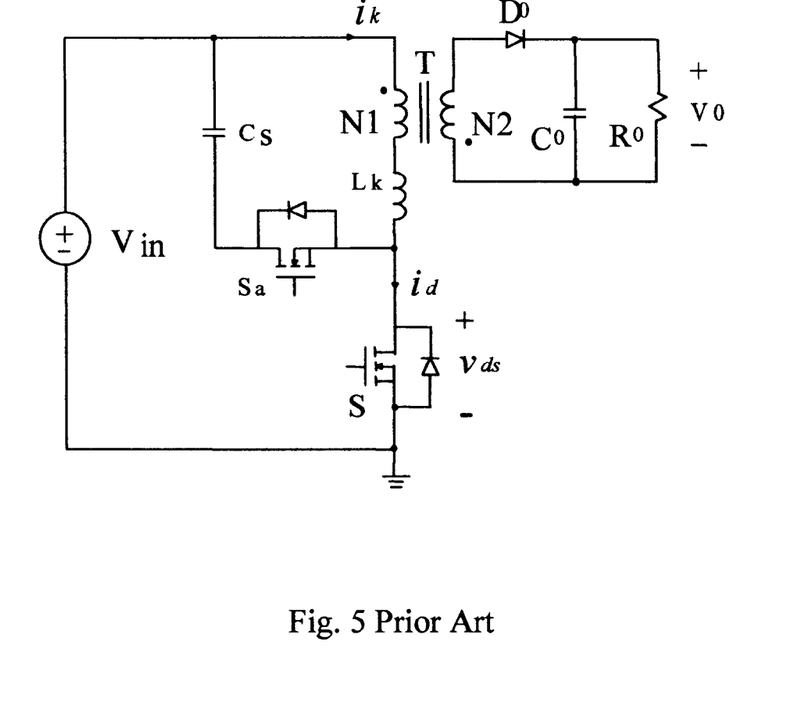
FIG. 5 shows a DC/DC flyback converter with an active clamp according to the prior art.

Another well-known prior art method provides an active clamp, as shown in FIG. 5. See, R. Watson, F. C. Lee and G. C. Hua, "Utilization of an active clamp circuit to achieve soft-switching in flyback converters" IEEE Power Electronics Specialists Conference (1994). An active switch $S_a$ and a capacitor $C_s$ are provided in series and connected in the primary winding N1 of the transformer T. When switch S is turned off, switch $S_a$ is turned on. The leakage energy is transferred to the capacitor $C_s$ through switch $S_a$, and the voltage across $C_s$ is used to reset the transformer. As a result, the voltage across switch S is clamped. However, such a converter requires an additional active switch and its controller. It increases the cost, which is not desirable for manufacturers.

See, U.S. Pat. No. 4,675,796, expressly incorporated herein by reference, discussed below. See also, Farrington, U.S. Pat. No. 5,883,795 and Farrington, U.S. Pat. No. 5,883,793, expressly incorporated herein by reference.

U.S. Pat. No. 6,108,218, "Switching Power Supply with Power Factor Control", provides two embodiments. In a first embodiment, shown in FIGS. 1 and 2 thereof, no snubber circuit to recycle the leakage energy of the transformer is shown. FIGS. 3 and 4 provide an additional active switch as part of the snubber.

U.S. Pat. No. 5,982,638, "Single stage power converter with regenerative snubber and power factor correction" provides a capacitor 44 in FIG. 1, which is not only used as a snubber capacitor, but also used to achieve power factor correction, and therefore handles the main power flow from the input to the output. Therefore, the current flowing through this capacitor 44 is very large, which requires a capacitor large in size and value. In this circuit, the recovery of energy from the snubber capacitor 44 occurs by transfer to the input inductor 38 when switch 22 turns on. Since the energy stored in capacitor 44 is large, which causes higher power loss in the circuit. As a result, it has lower power conversion efficiency. The capacitance of capacitor 44 is determined by the input power and satisfies the power factor and input current harmonics requirements.

U.S. Pat. No. 5,991,172, "AC/DC flyback converter with improved power factor and reduced switching loss," provides a third transformer winding which is not used to recover the leakage energy of the transformer, but rather to reduce the switching loss and improve the power factor. The leakage energy is dissipated by the circuit. Thus, it provides no substantial improvement in efficiency over a dissipative R-C-D snubber.

U.S. Pat. No. 5,999,419, "Non-isolated Boost Converter With Current Steering" relates to a buck boost converter having a tree-winding transformer.

U.S. Pat. No. 5,896,284, "Switching Power Supply Apparatus With a Return Circuit That Provides A Return Energy Ro A Load", relates to a power supply circuit which utilizes leakage inductance energy to enhance efficiency, for example with a magnetically isolated inductor.

U.S. Pat. No. 5,615,094, "Non-Dissipative Snubber Circuit For A Switched Mode Power Supply", relates to a snubber circuit for a secondary circuit of a power supply.

U.S. Pat. No. 5,694,304, "High Efficiency Resonant Switching Converters"; and U.S. Pat. No. 5,379,206, "Low Loss Snubber Circuit With Active recovery Switch" each provide a dual active switch architecture converter.

U.S. Pat. No. 5,055,991, "Lossless Snubber", relates to a converter circuit having an active switch and a transformer with five inductively coupled windings.

U.S. Pat. No. 5,019,957, "Forward Converter Type of Switched Power Supply", relates to a dual active switch forward power converter.

U.S. Pat. No. 4,805,079, "Switched Voltage Converter", provides a converter with a snubber circuit.

U.S. Pat. No. 4,760,512, "Circuit for Reducing Transistor Stress and Resetting the Transformer Core of a Power Converter", relates to a single active switch, triple inductively coupled winding transformer forward converter.

U.S. Pat. No. 4,736,285 relates to a "Demagnetization circuit for Forward Converter", having two active switches.

U.S. Pat. No. 4,688,160, "Single Ended Forward Converter With Resonant Commutation of Magnetizing Current", provides a forward converter employing a resonating capacitor to reset the transformer core.

U.S. Pat. No. 4,561,046, "Single Transistor Forward Converter With Lossless magnetic Core Reset and Snubber Network", relates to a forward converter having a single switch and a transformer having three inductively linked windings.

U.S. Pat. No. 4,441,146, "optimal Resetting of the Transformer's Core in Single Ended Forward Converters", provides a forward DC/DC converter having a transformer with three inductively coupled windings.

U.S. Pat. No. 4,355,352, "DC To DC Converter", relates to a converter having three coupled inductor windings, with two capacitors and two switching devices (one active and one passive), to provides a ripple free input and output current.

SUMMARY OF THE INVENTION

The present invention provides a switching power circuit, in which leakage energy of a flyback transformer is efficiently recycled to the output and voltage spike across the switch reduced, by clamping the voltage across the switch using an winding-capacitor-diode snubber inductively coupled to the flyback transformer.

Accordingly, the voltage across the main switch due to the leakage inductance of the transformer is clamped, achieving a reduction in peak voltage across the switch, and the energy inherent in the voltage spike is recaptured, to increase overall circuit efficiency. Further, the circuit may be constructed using a single active switch and a single inductively coupled transformer structure. Thus, the cost is low and the circuit takes up little additional space.

The snubber capacitor $C_s$ only deals with the leakage energy, which is only about 2% of total power handled by the circuit. This allows use of a relatively small snubber capacitor. In addition, the size of the capacitor $C_s$ is independent of the input power level.

The leakage energy is recovered through an extra winding of the flyback transformer, and becomes the part of the magnetizing energy when the main switch S is turned on.

Thus, it is an object of the invention to provide an winding-capacitor-diode snubber for a flyback converter providing voltage clamping across the active switch and which recycles energy from the clamped transient, without requiring a separate active switch nor separate inductor.

It is also an object of the invention to provide a flyback converter circuit having an active switch, diode, capacitor, flyback transformer and an winding-capacitor-diode snubber for reducing a voltage spike transient across the active switch, wherein the winding-capacitor-diode snubber is configured to transfer energy from the voltage spike transient to the output through an inductor coupled to the flyback transformer. The snubbing energy recovery switching is passive, through the diodes, and therefore no additional active switch is required.

It is a further object of the invention to provide a method of operating a flyback converter for improved efficiency, the flyback converter circuit having an active switch, diode, capacitor, flyback transformer and an winding-capacitor-diode snubber for reducing a voltage spike transient across the active switch, wherein the winding-capacitor-diode snubber passively switches to transfer energy from the voltage spike transient to the output through an inductor coupled to the flyback transformer.

According to a boost-flyback switching converter embodiment of the invention an energy efficient snubber circuit is provided, having an input inductor and an actively controlled switch, comprising a transformer having a primary, secondary and auxiliary winding, a clamping capacitor and a first passive switch in series across the primary winding, the auxiliary winding of the transformer and a second passive switch being connected, in series, to the node between the clamping capacitor and first passive switch and ground, and the active switch is connected between ground and a side of the primary winding opposite the first passive switch. The circuit may also be configured as a power factor correction circuit.

According to a method of the present invention for efficiently snubbing an active switch in a converter circuit, having a transformer, in which a magnetizing energy and leakage inductance energy are supplied to a transformer, and a clamping capacitor discharged during a conducting state of the active switch, and the magnetizing energy and leakage inductance energy transferred to the load, and the clamping capacitor charged during a nonconducting state of the active switch. Thus, the circuit including the secondary winding of the transformer is configured to receive energy when the active switch is turned off. The clamping capacitor clamps the voltage across the active switch during a turn-off transient. The leakage inductance energy, passing through the clamping capacitor, is recycled to the load through an auxiliary winding of the transformer, to reset the transformer. The circuit thus efficiently transfers energy, including energy corresponding to a switching transient of the active switch, to the load, while limiting maximum active switch voltage and properly resets the transformer each cycle, employing only a single active switch and a single inductive component. The circuit may, of course, include further components.

A control circuit for controlling the active switch is of known type, and for example, provides operation in a pulse-width modulation mode. The output circuit, for example, includes the secondary winding connected to a single diode with a capacitor filter, although more complex designs may be employed.

The passive switches are, for example, semiconductor diodes, while the active switch is, for example, a metal-oxide-silicon field effect transistor. The transformer is a flyback transformer, having an auxiliary winding. The various transformer windings are preferably electrically isolated, and the design is compatible with circuit designs having a plurality of secondary windings.

A capacitor is preferably provided in series between said active switch and said primary winding, for example having a voltage waveform that is out of phase with the clamping capacitor waveform. The auxiliary winding of the transformer and the second passive switch are preferably in series with the first passive switch across the capacitor; the active switch preferably is in series with a magnetically isolated inductor, across an input voltage source; and the auxiliary winding of the transformer and the second passive switch are preferably connected through the first passive switch to a common node of the primary winding and a ground-referenced capacitor. Various modifications of the arrangement are possible, which do not essentially alter the function of the circuit to limit voltage across the switch and efficiently recapture energy from the turning off of the active switch. During an active switch OFF steady state condition, i.e., after settling of transients, the first and second passive switches are reverse biased. During the ON state, leakage energy from the primary winding is transferred from the clamping capacitor to the auxiliary winding as a part of the magnetizing energy, whereby said leakage energy is inductively coupled to the secondary winding. The active switch may include an intrinsic diode or one may be provided externally or separately. Thus, the auxiliary transformer winding transfers energy from a switching transient of the active switch to the secondary winding.

In a power factor correction embodiment, the active switch is connected in series with an inductively isolated inductor to a rectified output of a full wave rectifier.

These and other objects will become apparent from a review of the Detailed Description of the Preferred Embodiments and drawings.

DETAILED DESCRIPTION OF THE PREFERRED EMBODIMENTS

EXAMPLE 1

Figure 6:
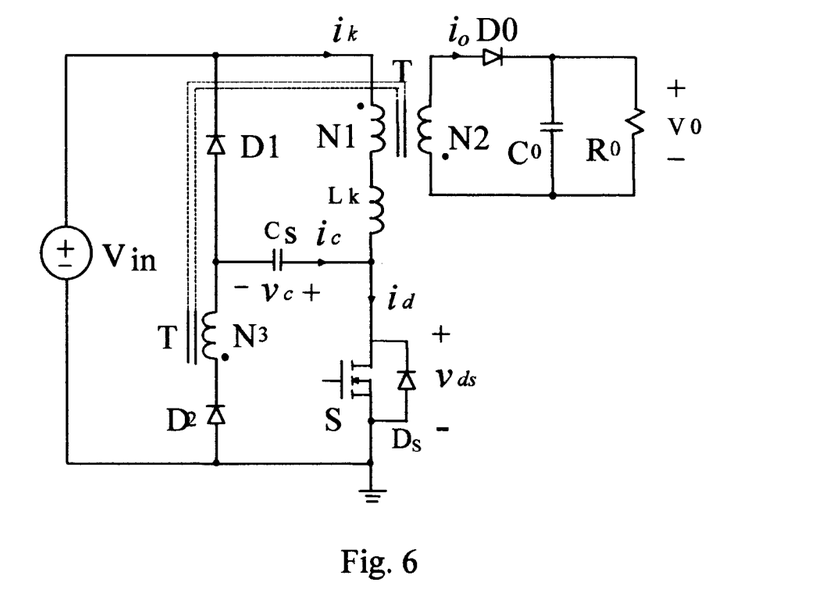
FIG. 6 shows a circuit diagram of a flyback converter with leakage energy recovery of the transformer.

FIG. 6 shows a flyback converter circuit according to the present invention. In the circuit shown in FIG. 6, an ON state of the switch S energizes the primary winding N1 of the transformer T. The polarity of the secondary winding N2 and rectifier DO are such that principal power transfer does not occur until the active switch is turned OFF. The leakage energy stored in the snubber capacitor is transferred to the magnetizing energy during the active switch ON period, and then transferred to the output after the switch is turned OFF, allowing use of a relatively small capacitor.

This is in contrast to the circuit according to Gautherin et al., U.S. Pat. No. 4,675,796 (e.g., FIG. 7), expressly incorporated herein by reference, in which principal power transfer occurs principally when the switch is ON, due to the opposite respective polarities of the transformer secondary and rectifier as compared to the present invention. Thus, Gautherin et al. discloses a circuit having a different mode of operation than the present invention. See also, Farrington, U.S. Pat. No. 5,883,795 and Farrington, U.S. Pat. No. 5,883,793, expressly incorporated herein by reference.

In FIG. 6, $L_k$ is the leakage inductance of the transformer T. Capacitor $C_s$ is the clamp capacitor to clamp the voltage across switch S during the switch off period. Winding N3 is coupled with the windings N1 and N2 of the transformer T. Diode D2 is in series with winding N3 to stop the full wave resonance between leakage inductance $L_k$ and clamp capacitor $C_s$.

This circuit is similar to the prior art circuit shown in FIG. 4, with a particular difference being that a coupled winding N3 is used to replace the pure inductor of FIG. 4. By doing so, not only is one magnetic component saved, but also the leakage energy is directly fed to the output instead of fed to the input as in the circuit of FIG. 4. As a result, the circuit provides a circuit having low component count, low cost and high conversion efficiency.

Figure 7:
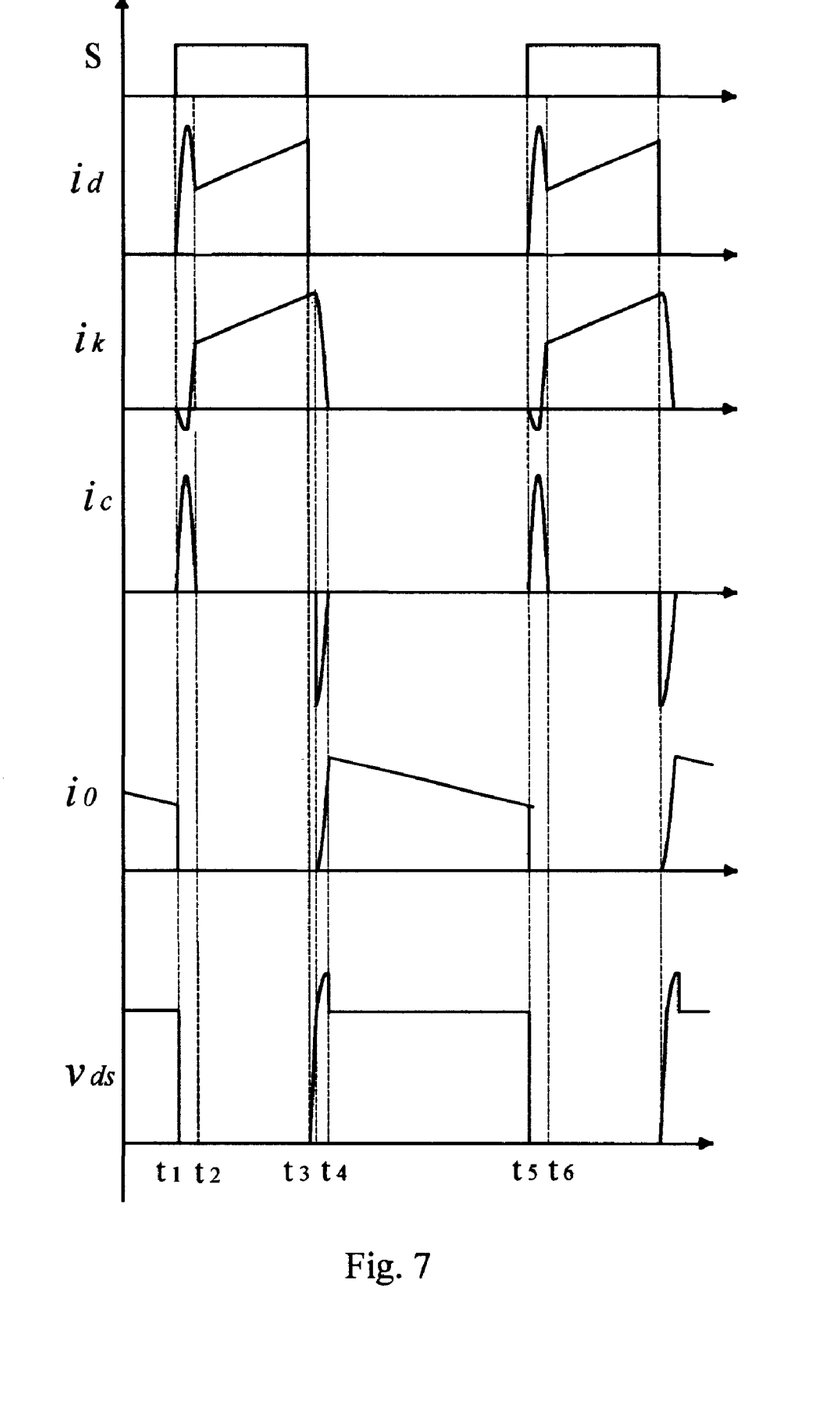
FIG. 7 shows switching waveforms of the circuit according to FIG. 6.

FIG. 7 shows the typical switching waveforms of FIG. 6. Before $t_1$, switch S is off. When S is turned on at $t_1$, voltage $V_c$ is applied to the winding N3. The capacitance $C_s$ and the magnetizing inductance in winding N3 form a resonant circuit. The energy stored in capacitor $C_s$ is transferred to the magnetizing inductor until the current in the winding N3 and the clamp capacitor discharging current reach zero at $t_2$. Meanwhile, the capacitor voltage $V_c$ is applied to the winding N3, which induces a voltage in winding N1. Therefore, the voltage difference between the input voltage $V_{in}$ and winding voltage across N1 is applied to the leakage inductance $L_k$ during time period from $t_1$ to $t_2$, which is given by $$v_{Lk} = V_{in} - \frac{N_1}{N_3} v_c$$

The current through the leakage inductor is calculated from $$i_{Lk} = \frac{1}{Lk} \int_{t_1}^{t} \left(V_{in} - \frac{N_1}{N_3} v_c\right) dt$$

The magnetizing current $i_{Lm}$ is sum of the leakage inductor current $i_{Lk}$ and the reflected winding current in N1 from winding N3, which is expressed as $$i_{Lm} = i_{Lk} + \frac{N_3}{N_1} i_c$$

From this equation, it can be seen that the energy stored in the snubber capacitor is transferred to the magnetizing energy during this period, which is finally delivered to the output during the switch off period. It is clear that the magnetizing current is supplied by the input source and the clamping capacitor $C_s$ during this time interval.

After $t_2$, the converter operates as a conventional flyback converter, and the magnetizing current flows completely from the input voltage source $V_{in}$ until $t_3$, when switch S is turned off. When switch S is turned off, both magnetizing inductor and leakage inductor charge the output capacitor of switch S until the drain-to-source voltage $v_{ds}$ across switch S reaches the input voltage plus the clamping voltage $V_c$, then the clamping diode D1 begins to conduct. The clamp capacitor voltage is applied to the magnetizing inductor and the leakage inductor, forming a voltage divider between two inductances. The clamp capacitor continues to be charged until the voltage across the magnetizing inductance is sufficient to forward bias diode D0. The primary winding voltage is then clamped by the reflected output voltage.

The clamp capacitor $C_s$ and the leakage inductor form a resonant circuit, and all the leakage energy is transferred to the clamp capacitor $C_s$ at $t_4$, where the clamp capacitor voltage reaches its maximum value and capacitor charging current equals zero, and diode D1 stops conducting. Therefore, the maximum voltage across switch S is given by $$V_{ds,max} = V_{in} + V_{c,max}.$$

After $t_4$, no current flows through clamp capacitor $C_s$ and leakage inductance $L_k$, and the voltage across switch S is equal to $V_{in} + n\,V_0$, where $$n = \frac{N_1}{N_2}.$$

The magnetizing energy now outputs to the load.

The above analysis demonstrates that the leakage energy of the transformer is fully recovered. It is first transferred to the clamp capacitor, then delivered to the magnetizing inductor through coupling winding, and finally output to the load.

EXAMPLE 2

Figure 8:
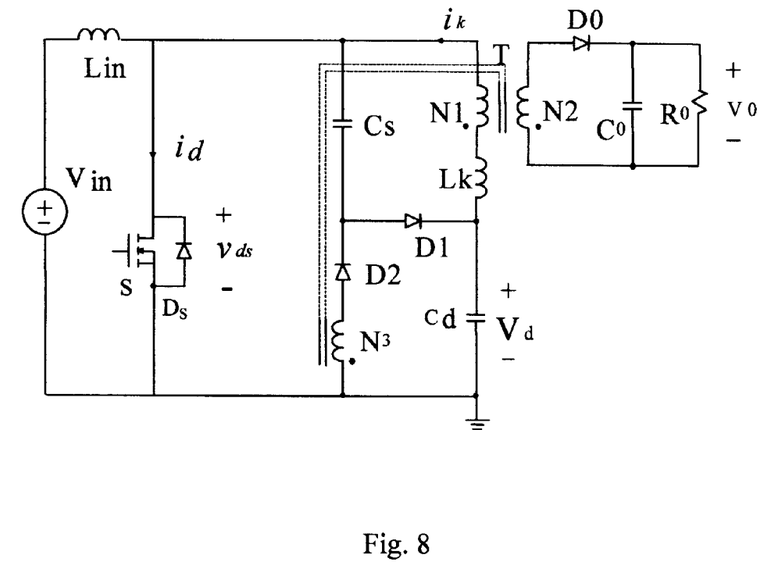
FIG. 8 shows a DC/DC boost converter with a DC/DC flyback converter according to the present invention.
Figure 9:
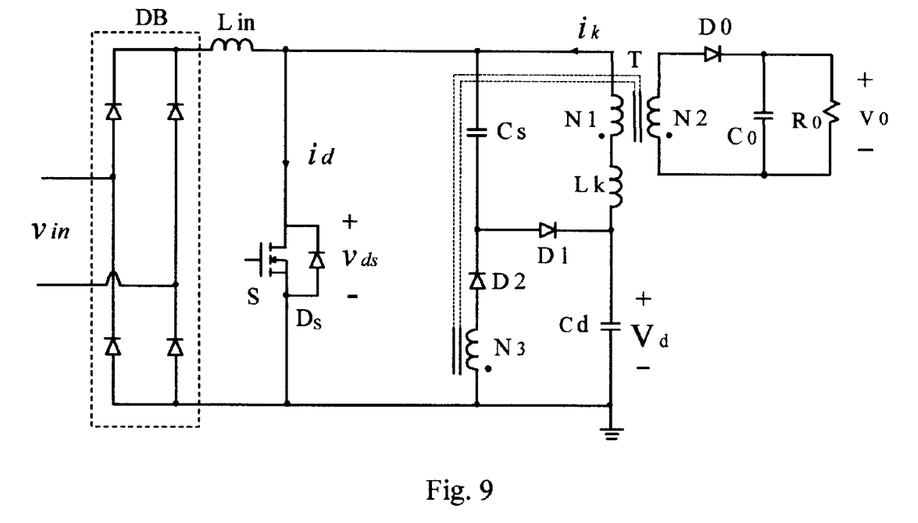
FIG. 9 shows a power factor correction circuit according to the present invention.

In accordance with embodiments of the invention, the circuit according to example 1 provides a basis for enhancements, as shown in FIGS. 8 and 9.

FIG. 8 is a converter, which integrates a DC/DC boost converter with a DC/DC flyback converter, and the circuit in FIG. 9 is its corresponding power factor correction circuit.

These circuits differ from the circuit according to FIG. 6 in that an input inductance, $L_{in}$, which is provided, for example, by a magnetically isolated inductor, is provided between the power source and the remainder of the converter circuit. This inductance results in a boost function from switching of switch S. Therefore, in contrast to the analysis of the circuit according to FIG. 6, the switch voltage will be greater, and subject to resonant peaks. The principle of operation of these two circuits is otherwise similar to the circuit in FIGS. 6 and 7.

When switch S is turned ON, the input source voltage $V_{in}$ charges inductor $L_{in}$, and the input current $i_{in}$ linearly increases. Capacitor $C_s$ discharges through switch S, diode D2 and winding N3. This discharging current is coupled to the winding N1 and becomes a part of the magnetizing current. At the same time, the voltage $V_d$ is applied to the primary winding N1, and also becomes part of the magnetizing current. When switch S is turned OFF, the inductor current $i_{in}$ charges capacitor $C_d$ through a loop $L_{in}$-N1-$L_k$-$C_d$-$V_{in}$. The leakage energy is transferred to the capacitor $C_s$ through diode D1 and the capacitor voltage $V_s$ is applied to the primary winding N1, and forward biases output diode D0, and the magnetizing energy is then transferred to the output. Therefore, both leakage energy and magnetizing energy are recovered, and the voltage across switch S is clamped.

Since the circuit according to the second embodiment is a current fed power converter, it is suitable for power factor correction applications. FIG. 9 shows the power factor correction circuit, provided by replacing the $V_{in}$, with AC line input and a full wave diode bridge rectifier DB as compared with FIG. 8.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A switching converter, comprising:

a transformer having a primary, secondary and auxiliary winding;

an actively controlled switch;

a clamping capacitor and a first passive switch in series across the primary winding, said actively controlled switch being connected between ground and a side of the primary winding opposite said first passive switch;

said auxiliary winding of the transformer and a second passive switch being connected, in series, to the node between the clamping capacitor and first passive switch and ground, to reset said transformer when said actively controlled switch is open; and an output circuit including said secondary winding, configured to selectively draw power from the transformer when said actively controlled switch is open.

2. The switching converter according to claim 1, wherein said first and second passive switches each comprise a semiconductor diode.

3. The switching converter according to claim 1, wherein said transformer is a flyback transformer.

4. The switching converter according to claim 1, wherein said primary winding, secondary winding and auxiliary winding are each electrically isolated.

5. The switching converter according to claim 1, wherein said actively controlled switch comprises a metal-oxide silicon field effect transistor (MOSFET).

6. The switching converter according to claim 1, further comprising a control to drive said actively controlled switch in a pulse width modulation mode.

7. The switching converter according to claim 1, wherein said output circuit comprises a closed loop series connection of said secondary winding, a diode and a capacitor.

8. The switching converter according to claim 1, further comprising a capacitor forming a closed loop circuit with said auxiliary winding said second passive switch and said first passive switch.

9. The switching converter according to claim 1, wherein said actively controlled switch is in series with a magnetically isolated inductor across an input voltage source.

10. The switching converter according to claim 1, wherein said auxiliary winding of the transformer and said second passive switch are connected through said first passive switch to a common node of said primary winding and a ground-referenced capacitor.

11. The switching converter according to claim 1, wherein said actively controlled switch is connected in series with an inductively isolated inductor to a rectified output of a full wave rectifier.

12. The switching converter according to claim 1, wherein said switching converter corrects a power factor.

13. The switching converter according to claim 1, wherein:

said first and second passive switches comprise semiconductor diodes which are reverse biased during steady state operation when said actively controlled switch is conducting; and said actively controlled switch comprises a metal-oxide-silicon field effect transistor (MOSFET) and an effective electrically parallel semiconductor diode.

14. The switching converter according to claim 1, wherein said actively controlled switch comprises a metal-oxide-silicon field effect transistor (MOSFET) having an intrinsic body diode.

15. The switching converter according to claim 1, wherein said actively controlled switch comprises a metal-oxide-silicon field effect transistor (MOSFET) in parallel with a diode.

16. The switching converter according to claim 1, wherein a leakage energy from the primary winding is transferred from said clamping capacitor to said auxiliary winding when the actively controlled switch is conducting, whereby said leakage energy is inductively coupled to the secondary winding.

17. A method of efficiently snubbing a flyback converter having an active switch and a transformer, comprising adding magnetizing energy and leakage inductance energy to the transformer with a primary winding of the transformer and discharging a capacitor during an active switch conduction cycle; and clamping a voltage across the active switch with the capacitor, recovering the leakage inductance energy through the capacitor and a separate inductively linked winding of the transformer, and transferring the magnetizing energy and leakage inductance energy to a secondary winding of the transformer during an active switch non-conduction cycle, to efficiently transfer energy to the load while limiting maximum active switch voltage.

18. The method according to claim 17, wherein the active switch is controlled to control a power factor and regulate an output voltage.

19. The method according to claim 17, wherein the capacitor and a first passive switch are in series across the primary winding, the active switch being connected between ground and a side of the primary winding opposite the first passive switch; the separate inductively linked winding of the transformer and a second passive switch are connected, in series, to the node between the clamping capacitor and first passive switch and ground, and the transformer comprises a secondary winding, the secondary winding being connected in a closed diode and a capacitor.

20. A switching converter, comprising:

a transformer having a primary, secondary and auxiliary winding;

a first closed circuit, comprising, in series, a clamping capacitor, a first passive switch and the primary winding;

a second closed circuit, comprising, in series, a series connection of said auxiliary winding of the transformer and a second passive switch, the clamping capacitor and an actively controlled switch; and an output closed circuit, comprising, in series, the secondary winding, a third switch, and a load, wherein said output closed circuit selectively draws power from the transformer when said actively controlled switch is open.

* * * * *